United States Patent [19]

Kurz

[11] Patent Number: 4,937,455
[45] Date of Patent: Jun. 26, 1990

[54] POSITION-SENSITIVE DIRECTOR

[75] Inventor: Rainer Kurz, Jülich, Fed. Rep. of Germany

[73] Assignee: Kernforschungsanlage Julich GmbH, Julich, Fed. Rep. of Germany

[21] Appl. No.: 155,048

[22] Filed: Feb. 11, 1988

[30] Foreign Application Priority Data

Feb. 14, 1987 [DE] Fed. Rep. of Germany ....... 3704716

[51] Int. Cl.$^5$ .............................................. G01T 1/185
[52] U.S. Cl. ............................ 250/385.1; 250/213 R; 250/374
[58] Field of Search ................. 250/385.1, 374, 213 R

[56] References Cited

U.S. PATENT DOCUMENTS

| 4,142,101 | 2/1979 | Yin ................................. 250/363 R |
| 4,382,180 | 3/1983 | Woolgar ....................... 250/213 VT |
| 4,429,228 | 1/1984 | Anderson ........................... 250/374 |
| 4,454,422 | 6/1984 | Persyk ............................. 250/385.1 |

FOREIGN PATENT DOCUMENTS 2724747 12/1978 Fed. Rep. of Germany .

OTHER PUBLICATIONS

D. F. Anderson et al., Nuclear Instruments And Methods 217, Coupling of a BaF$_2$ Scintillator to a Time Photocathode and a Low-Pressure Wire Chamber, pp. 217-223, (1983).
The Review of Scientific Instruments, vol. 29, No. 1, 1958, pp. 27-33, Hal O. Anger, Scintillation Camera.
Nuclear Instruments and Methods 196, pp. 63-67, 1982, William H.-M. Ku et al., Properties of an Imaging Gas Scintillation Preparation Counter.
Technik des Messens Radioaktiver Strahlung, pp. 178-181, 1963, H. C. Paul Gorlich.

Primary Examiner—Carolyn E. Fields
Attorney, Agent, or Firm—Shlesinger & Myers

[57] ABSTRACT

A position-sensitive detector for electronically imaging objects emitting low-intensity light radiation, comprises a photocathode means for converting incident low-intensity light radiation into electrons; electron acceleration means disposed in series with the photocathode means for accelerating the electrons generated by the photocathode means; transducer means disposed in series with the acceleration means for converting the accelerated electrons into ultra-violet radiation; and a multi-wire chamber means disposed in series with the transducer means for providing readout of the position of the ultra-violet radiation.

A detector having a solid scintillator for electronically imaging objects emitting low-intensity x-ray or gamma ray or the like is also disclosed.

21 Claims, 2 Drawing Sheets

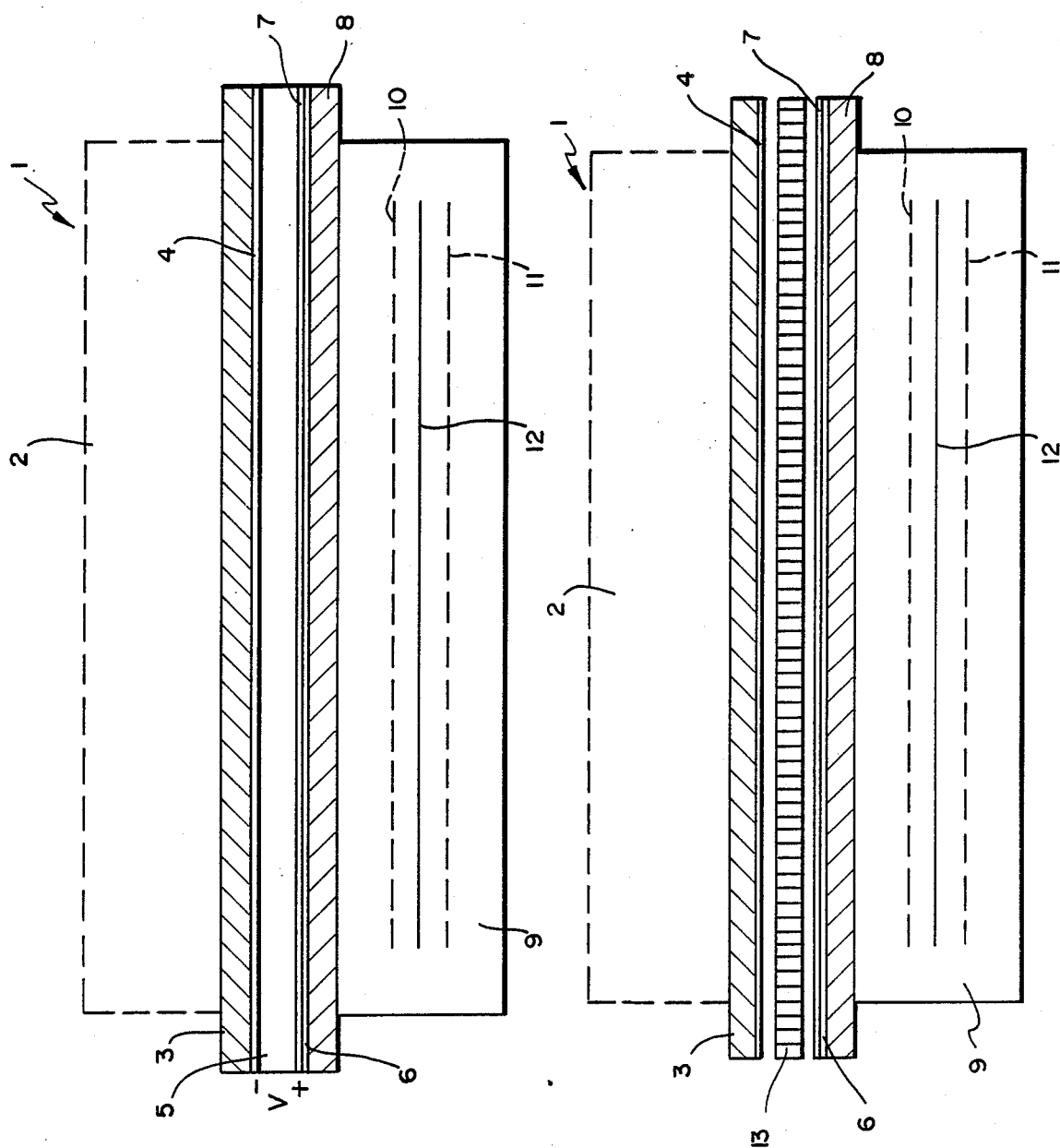

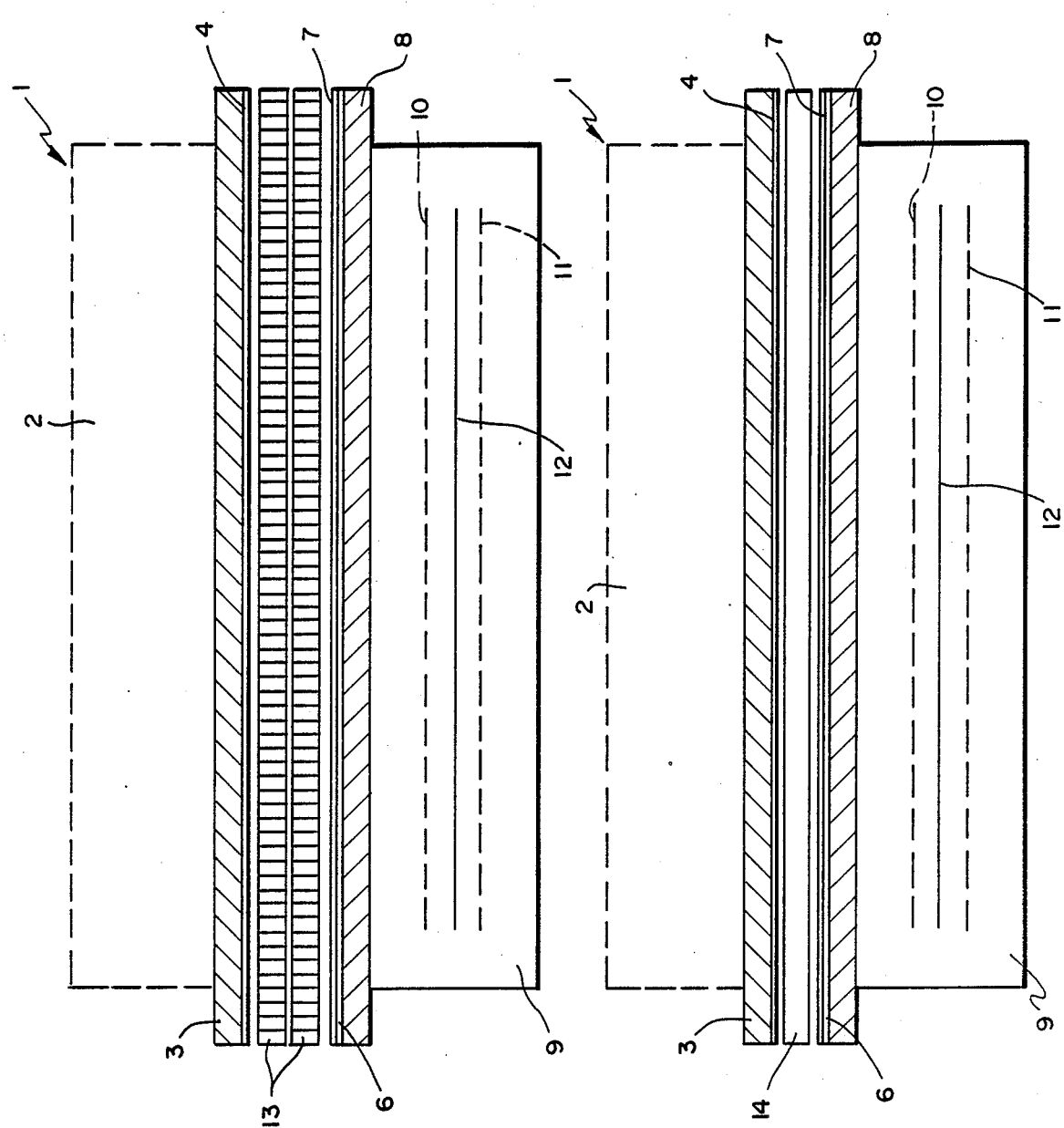

POSITION-SENSITIVE DIRECTOR

FIELD OF THE INVENTION

The invention concerns a position-sensitive detector to electronically visualize objects emitting low-intensity radiation and comprising a transducer to generate photon rays of that wavelength at which an optically subsequent multi-wire chamber reading out the location of the incident radiation shall respond.

BACKGROUND OF THE INVENTION

Such a position-sensitive detector is described in NUCLEAR INSTRUMENTS AND METHODS 217, 217-233 (1983), D. F. Anderson et al, "Coupling of BaF$_2$ Scintillator to a TMAE Photocathode and a Low-Pressure Wire Chamber". In this detector, a BaF$_2$ scintillator is followed by a multi-wire proportional chamber. Upon incidence of high-energy particles or quantum radiation upon the scintillator, uv-photons are generated which cause ionization in the multi-wire chamber. The uv sensitivity of the multi-wire chamber is achieved by added tetrakis(dimethylamino)ethylene abbreviated as TMAE, to the counting gas. Relative to the already long known and so-called Anger camera (REV. SCI. INSTRU. 29, 27 [1958], H. O. Anger, "Scintillation Camera"), this detector evinces a lightweight, compact and simple design.

However the known detector essentially is suitable only to sense high-energy radiation. Where low-energy radiation is concerned, for instance soft x-rays or light radiation from distant objects, not enough photons are generated in the scintillator to achieve accurate position determination and good energy resolution.

OBJECTS AND SUMMARY OF THE INVENTION

Accordingly it is the object of the invention to create a position-sensitive detector for electronic visualization which is characterized on one hand by a simple, compact and lightweight design and thereby by easy handling, and which on the other hand also will provide accurate position determination and good energy resolution even from weakly emitting objects.

The invention solves this problem on the basis of a detector of the initially cited kind in that an amplifier is optically coupled to the multi-wire chamber, said amplifier consisting of at least one photon converter to convert the photons into free electrons, of a path to accelerate the electrons and/or an electron multiplier and the transducer, the transducer consisting of a material converting electrons into the photons for the multi-wire chamber.

In the invention therefore the previously known position-sensitive detector is provided with an amplifier which initially converts the incident electromagnetic radiation into electrons and then accelerates and/or multiplies these electrons, so that substantially more photons are released from the correspondingly matched transducer than heretofore. Consequently the detector is correspondingly more accurate regarding position and energy resolution. Moreover, higher linearity and better long-term stability are achieved. Compared to the Anger camera, substantially higher pulse frequencies can be processed, whereby dynamic measurements are made possible or at least are significantly simplified.

The detector nevertheless remains simple, lightweight and compact.

In particular the detector of the invention can be used to sense electromagnetic radiation in the wavelength range between infrared and hard gamma rays. The photon converter must be matched to the particular radiation to be detected, so that the photons be converted as efficiently as possible into electrons. Where an electron multiplier is used, it may convert the incident photons within certain ranges, for instance x-rays or uv, into electrons while the latter are simultaneously multiplied. As a rule an electron multiplier will also be combined with an electron accelerating path.

The implementation of the invention also provides that a scintillator shall optically precede the photon converter, where the latter is sensitive to the emission spectrum of the former. Such a scintillator is especially desirable if such a range of wavelengths of electromagnetic radiation is to be investigated wherein the photon converter is insensitive or only inadequately responsive, while on the other hand a scintillator is available which is especially effective in that range and which evinces an emission spectrum matching the photon converter. Again, when the proper material is selected for the scintillator, it will be possible to show the presence of particle radiation such as from neutrons, ions and electrons. Thereby it is possible to optimally match and amplify the particular radiation to be detected. Correspondingly good results are achieved regarding accuracy of position and energy resolution. If in the process gamma and x-rays are investigated, then a NaI(Tl) crystal will be especially suitable. If thermal neutrons are to be detected, then a scintillator containing 6-Li should be used. However such examples are meant merely illustratively and they do not exclude other crystals. The subsequent photon converter very easily is matched to the emission spectra of these crystals, and therefore optimal conversion of the photons from the scintillator into electrons will take place.

A photocathode is especially well suited as a photon converter. Its spectral sensitivity can be matched by known means to the particular wavelength spectrum or emission spectrum of any additional preceding scintillators, and this can be accomplished over wide ranges.

Photo conversion furthermore can be carried out by so-called proximity diodes. Such a diode may be in the form of a very compact near-focus image amplifier from which the incident light ejects photoelectrons from the photocathode, these electrons then being moved by an acceleration voltage of about 10 to 30 kv toward a phosphor with light-tight cover where they initiate light emission. The distance between the photocathode and the phosphor is very short, about 1 to 3 mm, and therefore the image at the photocathode is reproduced practically losslessly as regards sharpness on the phosphor. Such proximity diodes illustratively are available under the trademark PROXIFIER from PROXITRONIC D-6140, Bensheim.

Where electron multipliers are used, the so-called microchannel plates are desirable which on one hand are very thin while on the other evince large cross-sections.

The electron path is formed in known manner by applying a voltage in the space between the photon converter and the transducer. At least one electron optics furthermore may be mounted between the photon converter and the transducer to focus the electrons as needed or enlarge them.

Obviously the electron accelerator(s) and/or the electron multiplier(s) may be mounted several times in sequence, that is, in cascade, to further increase the light amplification.

A suitable transducer to convert electrons into photons was found to be a uv-emitting phosphor, especially $BaF_2$. This material was used already in the previously known detector, however therein as a scintillator to change photons of a particular wavelength into photons in the uv spectrum. The transducer furthermore may form the input window of the multi-wire chamber and thereby requires no further support. Preferably the transducer is coated on the light-amplifying side with a thin layer opaque to light but transparent to the electrons, illustratively of aluminum and several microns thick, to prevent optical coupling in the process.

DESCRIPTION OF THE DRAWINGS

FIG. 1 is a schematic side view, partly in cross section, and with portions shown in one embodiment of the invention.

FIG. 2 is a schematic side view, partly in cross section, and with portions shown in dashed lines of another embodiment of the invention, showing a microchannel plate.

FIG. 3 is a schematic side view, partly in cross-section, and with portions shown in dashed lines of yet another embodiment of the invention, showing two microchannel plates.

FIG. 4 is a schematic side view, partly in cross-section, and with portions shown in dashed lines of still another embodiment of the invention, showing an electron optics.

DETAILED DESCRIPTION OF THE INVENTION

A scintillator 2 (shown in dashed lines) made of a NaI(Tl) crystal is provided at the input. Such a scintillator responds especially to gamma and x-rays which it converts into light flashes. The scintillator 2 is optional for imaging objects emitting low-intensity light radiation.

The scintillator 2 is seated on an input window 3 on the lower side of which is mounted a photocathode 4 acting as a photon converter with a spectral sensitivity matched to the emission spectrum of the scintillator 2 in such a manner that the highest possible yield shall be achieved when converting the photons into electrons. The adjoining and evacuated gap 5 is the acceleration path, the acceleration being obtained by applying an accelerating voltage V. The gap 5 additionally may comprise an electron multiplier, preferably in the shape of a microchannel plate 13, as best shown in FIG. 2. As a result there would be both acceleration and multiplication.

A phosphor 6 consisting of $BaF_2$ follows the gap 5 and is seated on an output window 7. This phosphor 6 changes the electrons emitted by the photocathode 4 into uv photons. To prevent an accompanying optical coupling, the phosphor 6 is coated at its input side with very thin, light-opaque layer 7 which does however transmit the electrons.

The accelerated and possibly multiplied electrons eject substantially more uv photons from the phosphor 6 than the previously known scintillator. They irradiate a multi-wire chamber 9 mounted underneath the output window 8 and ionize a counting gas with a tetrakis(-dimethylamino)ethylene additive in said chamber. To read out the ionization location, two grids of cathode wires 10, 11 are located in two superposed planes and between them a grid of anode wires 12 in the multi-wire chamber 9. The center of gravity of the location of ionization can be determined in known manner by analyzing the electrical signals present at the cathode wires 10, 11.

The above described detector permits detecting even weakly radiating objects without being tied to the property of the phosphor 6 forming the input window of the multi-wire chamber 9. Therefore it is possible to read out an electromagnetic radiation of a wavelength hitherto unfit for the phosphor 6, and to do so with outstanding localization and energy resolution.

The detector 1 may include a plurality of microchannel plates 13 mounted in cascade, as best shown in FIG. 3.

The detector 1 may also include an electron optics 14, as best shown in FIG. 4.

I claim:

1. A position-sensitive detector for electronically imaging objects emitting low-intensity light radiation, comprising:
   (a) photocathode means for converting incident low-intensity light radiation into electrons;
   (b) electron acceleration means disposed in series with said photocathode means for accelerating the electrons generated by said photocathode means;
   (c) transducer means disposed in series with said acceleration means for converting the accelerated electrons into ultra-violet radiation; and
   (d) multi-wire chamber means disposed in series with said transducer means for providing readout of the position of the ultra-violet radiation.

2. A detector as in claim 1, and including:
   (a) electron multiplier means disposed between said photocathode means and said transducer means for increasing the number of electrons generated by said photocathode means.

3. A detector as in claim 2, wherein:
   (a) said electron multiplier means is a microchannel plate.

4. A detector as in claim 2, wherein:
   (a) said electron multiplier means includes a plurality of microchannel plates disposed in cascade.

5. A detector as in claim 1, and including:
   (a) at least one electron optics disposed between said photocathode means and said transducer means.

6. A detector as in claim 1, wherein:
   (a) said transducer means is an ultraviolet emitting phosphor.

7. A detector as in claim 6, wherein:
   (a) said phosphor includes $BaF_2$.

8. A detector as in claim 1, wherein:
   (a) said transducer means is an input window of said multi-wire chamber means.

9. A detector as in claim 1, wherein:
   (a) said transducer means includes a coating of light-opaque layer which is transparent to the electrons, said coating being disposed toward said photocathode means.

10. A position-sensitive detector for electronically imaging objects emitting low-intensity gamma rays or x-rays, comprising:
    (a) solid scintillator means for converting into photoradiation incident low-intensity radiation;
    (b) photocathode means disposed in series with said scintillator means for converting the photo-radiation generated by said scintillator means into electrons;
(c) electron acceleration means disposed in series with said photocathode means for accelerating the electrons generated by said photocathode means;
(d) transducer means disposed in series with said acceleration means for converting the accelerated electrons into ultraviolet radiation; and
(e) multi-wire chamber means for providing readout of the position of the ultra-violet radiation.

11. A detector as in claim 10, and including:
(a) electron multiplier means disposed between said acceleration means and said transducer means for increasing the number of electrons generated by said photocathode means.

12. A detector as in claim 10, wherein:
(a) said scintillator means includes NaI(Tl) crystal.

13. A detector as in claim 10, wherein:
(a) said scintillator means includes 6-Li.

14. A detector as in claim 11, wherein:
(a) said electron multiplier means is a microchannel plate.

15. A detector as in claim 11, wherein:
(a) said electron multiplier means includes a plurality of microchannel plates disposed in cascade.

16. A detector as in claim 10, and including:
(a) at least one electron optics disposed between said photocathode means and said transducer means.

17. A detector as in claim 10, wherein:
(a) said transducer means is an ultra-violet emitting phosphor.

18. A detector as in claim 17, wherein:
(a) said phosphor includes $BaF_2$.

19. A detector as in claim 10, wherein:
(a) said transducer means is an input window of said multi-wire chamber means.

20. A detector as in claim 10, wherein:
(a) said transducer means includes a coating of light-opaque layer which is transparent to the electrons, said coating being disposed toward said photocathode means.

21. A position-sensitive detector for electronically imaging objects emitting low-intensity gamma rays or x-rays, comprising:
(a) solid scintillator means for converting into photo-radiation incident low-intensity radiation;
(b) photocathode means disposed in series with said scintillator means for converting the photo-radiation generated by said scintillator means into electrons;
(c) electron multiplier means disposed in series with said photocathode means for increasing the number of electrons generated by said photocathode means;
(d) transducer means disposed in series with said multiplier means for converting the electrons into ultraviolet radiation; and
(e) multi-wire chamber means for providing readout of the position of the ultra-violet radiation.

* * * * *